(12) United States Patent
Fischer et al.

(10) Patent No.: US 7,053,499 B2
(45) Date of Patent: May 30, 2006

(54) ANTITHEFT DEVICE FOR A MOTOR VEHICLE AND A METHOD FOR OPERATING AN ANTITHEFT DEVICE

(75) Inventors: Robert Fischer, Kelheim (DE); Claus Peter, Regensberg (DE)

(73) Assignee: Siemens Aktiengesellschaft, Munich (DE)

( * ) Notice: Subject to any disclaimer, the term of this patent is extended or adjusted under 35 U.S.C. 154(b) by 467 days.

(21) Appl. No.: 10/289,612

(22) Filed: Nov. 7, 2002

(65) Prior Publication Data

US 2003/0098615 A1    May 29, 2003

(30) Foreign Application Priority Data

Nov. 9, 2001    (DE) ................ 101 55 123

(51) Int. Cl.
*B60R 25/00* (2006.01)
*B60R 25/04* (2006.01)
*B60R 25/10* (2006.01)

(52) U.S. Cl. ............... 307/10.4; 180/287; 340/426.16; 340/426.17

(58) Field of Classification Search ............... 307/10.5, 307/10.2, 10.3, 10.4; 340/426.13, 426.14, 340/426.15, 426.16, 426.17; 361/269; 180/287
See application file for complete search history.

(56) References Cited

U.S. PATENT DOCUMENTS

| 5,049,867 A * | 9/1991 | Stouffer ................ 340/426.17 |
| 5,276,728 A * | 1/1994 | Pagliaroli et al. ......... 455/404.1 |
| 5,905,431 A * | 5/1999 | Mueller et al. ......... 340/426.17 |
| 6,075,454 A * | 6/2000 | Yamasaki ................ 340/5.61 |
| 2002/0008615 A1* | 1/2002 | Heide et al. ................ 340/426 |
| 2003/0095030 A1* | 5/2003 | Greenwood ................ 340/5.61 |
| 2004/0075541 A1* | 4/2004 | Simoneau ............. 340/426.11 |

FOREIGN PATENT DOCUMENTS

| DE | 196 12 452 C1 | 4/1997 |
| DE | 199 57 536 A1 | 6/2001 |

* cited by examiner

*Primary Examiner*—Brian Sircus
*Assistant Examiner*—Hal I. Kaplan
(74) *Attorney, Agent, or Firm*—Baker Botts L.L.P.

(57) ABSTRACT

An antitheft device for a motor vehicle has a first receiver (2) in the motor vehicle, which is designed to receive signals in narrowband. The signals received by this receiver are evaluated in accordance with the code information contained in them. Furthermore, the antitheft device has a second broadband receiver (7) which receives signals outside the useful frequency band (3). If signals are received whose signal strength is above a threshold value (S), whose signal duration is shorter than a predefined time period ($t_2-t_1$) or whose code information corresponds largely to anticipated code information, the access to the motor vehicle, and its use, are not enabled.

20 Claims, 1 Drawing Sheet

ANTITHEFT DEVICE FOR A MOTOR VEHICLE AND A METHOD FOR OPERATING AN ANTITHEFT DEVICE

CROSS REFERENCE TO RELATED APPLICATION

This application claims priority to German application number 10155123.1 filed Sep. 11,2001.

BACKGROUND OF THE INVENTION

The invention relates to an antitheft device for a motor vehicle and to a method for operating an antitheft device for a motor vehicle.

A known antitheft device for a motor vehicle (DE 196 12 452 C1) has a receiver which is arranged at the vehicle end and is designed to receive and demodulate signals in narrowband. If a portable code generator emits a code signal with code information, the receiver can receive and demodulate this code signal. The code information contained in the code signal is passed on to an evaluation unit in which this code information is compared with reference or setpoint code information. When the two correspond, an enable signal is generated which locks or unlocks doors or enables an immobilizer, and the internal combustion engine is started.

Such an antitheft device can also utilize harmonics of the fundamental component at the carrier frequency as the code information is also contained in the harmonics. These harmonics are found at integral multiples of the carrier oscillations. This ensures that, when there is narrowband interference on the transmission path, the code information can nevertheless be reliably received and evaluated. However, the harmonics have lower amplitudes than the fundamental components at the carrier frequency in the useful frequency band. As a result complex receivers are required.

However, this known antitheft device cannot prevent the transmission link being manipulated, that is to say cannot prevent illegitimate recording and reproduction of the recorded signals which would permit an unauthorized person to gain access to the motor vehicle.

A further known antitheft device (DE 199 57 536 A1) attempts to prevent such manipulation of the transmission link by measuring a distance between the motor vehicle and code transmitter by means of radar signals which are emitted in broadband and code signals which are additionally modulated and transmitted back. The emitted code signal is considered to be authorized only if this distance lies within a predefined range and if the code information corresponds to the setpoint code information. This antitheft device is however very complex and is based on a precise measurement of the distance between the code generator and the motor vehicle.

SUMMARY OF THE INVENTION

The invention is based on the object of providing an antitheft device for a motor vehicle and a method for operating an antitheft device which are configured in a simple way and which largely prevent the transmission link being manipulated.

This object is achieved, for example, by an antitheft device for a motor vehicle comprising a first receiver which is arranged at the vehicle end and which is designed to receive in narrowband and to demodulate signals which are emitted by a remotely arranged transmitter, the signals of the transmitter containing code information which is modulated with a predefined carrier frequency, the carrier frequency lying within a predefined useful frequency band, and an evaluation unit to which the signals which are received and demodulated by the first receiver are passed on and which extracts the code information from the demodulated signals, compares it with setpoint code information and generates an enable signal when the two signals at least largely correspond, wherein the antitheft device has a second receiver which is designed to receive signals in broadband, the carrier frequencies of which signals lie outside the useful frequency band.

The second receiver can be arranged at the vehicle end and/or at the code generator end. A discriminator can be connected upstream or downstream of the second receiver and permits evaluation only if those signals which are received by the second receiver and whose signal reception strength exceeds a threshold value or which have changed significantly in terms of their amplitude in comparison with previously measured reception levels, the evaluation unit not generating or suppressing the enable signal if a signal is received at a signal reception level or with a change amplitude greater than a threshold value and/or if the code information contained in the signal at least largely corresponds to setpoint code information. A time window decision element can be arranged at the vehicle end, said time window decision element preventing the generation of the enable signal or suppressing it if the received signal is received with its signal level starting from a predefined time at which the reception of a signal is anticipated, and the signal level is above a predefined threshold value for at maximum a predefined time period (t2–t1). A triggering transmitter (11) may be arranged at the vehicle end and when triggering occurs it emits a request signal by means of which a portable code generator (12) is requested to transmit back a signal after reception of the request signal. The request signal can emit in the frequency band around 125 kHz in the case of a low-frequency carrier frequency, and the signal is transmitted back in a narrowband useful frequency band at approximately 315 MHz, or approximately 433 MHz or approximately 868 MHz, in the case of a high-frequency carrier frequency. The second receiver can have a bandstop filter by means of which at least the previously defined, narrowband useful frequency band is masked out when signals are received.

According to the present invention a method for operating an antitheft device for a motor vehicle, comprises the steps:

a first receiver arranged at the vehicle end is used to receive and demodulate signals within a useful frequency band and evaluate the code information contained in them, a second receiver can be used to receive signals outside the useful frequency band, and an enable signal is suppressed or not generated if the second receiver is used to receive a signal which contains code information which corresponds to setpoint code information or whose signal level is above a predefined threshold value only within a predefined time period.

The reception levels of the signals can be detected and only signals whose reception levels exceed a threshold value defined as a function of the respective frequency band or differ significantly from previously measured reception levels are evaluated.

Another method for operating an antitheft device for a motor vehicle comprises the steps of:
- receiving a transmitted signal by a narrowband receiver and a wideband receiver which excludes the narrowband;
- generating an enable signal if the narrowband receiver receives a valid code and the wideband receiver does not receive a signal having predefined characteristics.

The predefined characteristics can determined by a time discriminator, a threshold value discriminator, or a level change discriminator. The transmitted signal can be triggered by sending a request signal. A coded information can be extracted from the received signals and compared with stored setpoint information. The signal received by the wideband receiver can also be demodulated and compared with stored setpoint information. The time period of the received signals may be compared to determine whether the signal has been manipulated. In addition, the signal received by the wideband receiver can be demodulated and compared with the information demodulated from the narrowband signal to determine whether the signal has been manipulated. If no enable signal is generated a manipulation detection signal can be signalized by a visible, audible, or tactile signal.

According to the present invention, the antitheft device has an additional second receiver which is designed to receive signals in broadband. This receiver is used to receive signals outside the useful frequency band. By means of this second receiver it is possible to receive signals which are transmitted in a band other than the useful frequency band owing to a manipulation of the transmission link. The invention advantageously prevents the motor vehicle being able to be unlocked or used if such a manipulation is detected.

BRIEF DESCRIPTION OF THE DRAWINGS

Exemplary embodiment of the invention are explained in more detail below with reference to the schematic drawings, in which.

DETAILED DESCRIPTION OF THE PREFERRED EMBODIMENTS

Figure 1:
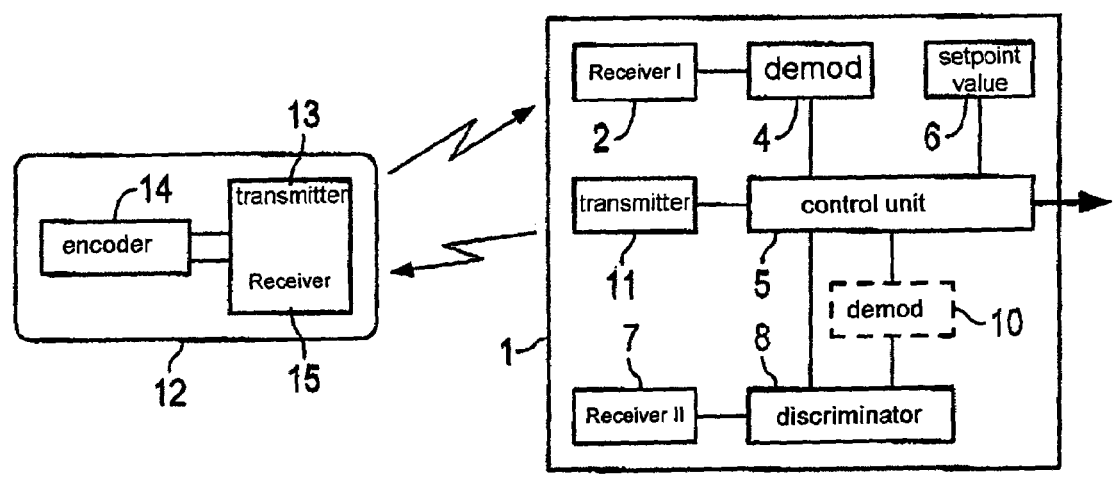
FIG. 1 shows a block circuit diagram of an antitheft device according to the invention.

An antitheft device according to the invention for a motor vehicle has, according to FIG. 1, a base station 1 in the motor vehicle. This base station 1 has at least a first receiver 2 which is designed to receive signals in narrowband, i.e. signals whose carrier frequency lies within a useful frequency band 3. The received signals are demodulated by means of a demodulator 4 and fed to a control unit 5 for evaluation.

In order to evaluate the signals, the control unit 5 compares the coded information contained in the received signals with reference or setpoint code information stored in a setpoint code memory 6. The reference or setpoint code information can also be generated in the base station 1 from predefined information by means of a mathematical algorithm.

In addition, the base station 1 also has a second receiver 7 which is designed to receive signals in broadband. However, this receiver 7 (including frequency bandstop filters or filters arranged downstream) extracts the signals which are transmitted in the useful frequency band 3 so that it only receives or passes on signals outside the useful frequency band 3.

The signals which are received by the second receiver 7 are fed to a discriminator 8 which determines whether the received signal is a constantly present interference signal or a possibly manipulated useful signal. The discriminator 8 can be, for example, a time discriminator (also referred to as a time window decision element), a threshold value discriminator (also referred to as a threshold value decision element) or else a level change discriminator. The output signal of the discriminator 8 can be fed via a demodulator 10 to the control unit 5 for evaluation in order to additionally evaluate the information content of the signal.

In addition, the base station 1 can also have a transmitter 11 which, when triggered (for example when the door handle is activated, or a switch in the vicinity of the door handle is activated)—driven via the control unit 5—emits a request signal, in response to which a code signal is anticipated from a portable code generator 12 which is assigned to the antitheft device.

The portable code generator 12 has at least one transmitter 13 via which an encoded signal (referred to as code signal) is emitted. The code signal contains code information which confirms authorization to access or to use the motor vehicle. This code information is generated by an encoder 14 or is stored in the code generator 12. The code information is modulated onto a carrier frequency and emitted as a code signal via the transmitter 13.

The emission of the code signal can be triggered by activating a pushbutton key or switching a switch on the code generator 12. It is also possible for the code signal to be emitted even if a request signal has previously been received by the base station 1.

The code signal is usually emitted at a previously determined carrier frequency (for example at approximately 433 MHz), specifically in a narrowband useful frequency band 3 such as has to be permitted for telecommunications for the respective application in any respective country.

Figure 2:
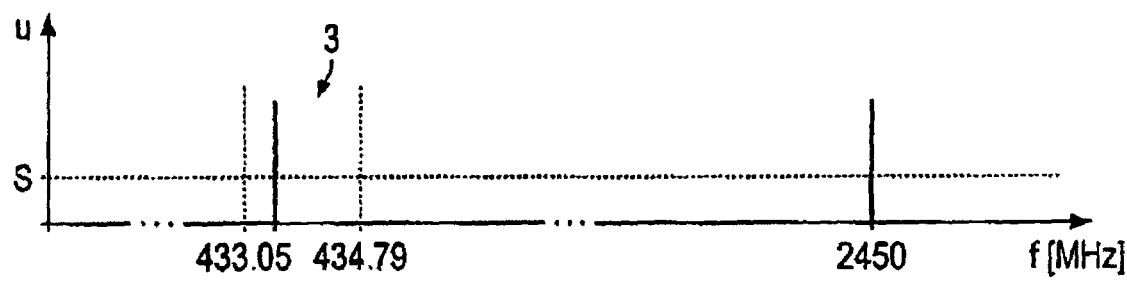
FIG. 2 shows a frequency spectrum of signals which are received by the antitheft device according to FIG. 1.

Thus, for example in Germany the narrowband useful frequency band 3 between 433.05 MHz and 434.79 MHz is permitted for signal transmissions for automotive equipment (cf. also FIG. 2). The first receiver 2 is then configured in such a way that it can receive all the signals which are transmitted within this useful frequency band. If such a code signal is then received in the useful frequency band 3, the code information contained in it is demodulated and evaluated in the control unit 5. For this purpose, the code information is compared with anticipated setpoint code information. If they at least largely correspond, an enable signal is generated by means of which doors are locked or unlocked or an immobilizer is enabled so that the internal combustion engine can be started.

However, there is the risk of the transmission link between the code generator 12 and base station 1 being manipulated and signals being illegitimately recorded and subsequently reproduced. Depending on the reproduction equipment, the signals which are manipulated and transmitted back may have higher signals levels than the useful signals and/or lie outside the useful frequency band 3. If the signals have high enough power and lie outside the useful frequency band 3, they are received by the second receiver 7.

FIG. 2 illustrates the frequency spectrum of an exemplary embodiment in which the code generator 12 is dimensioned in such a way that the code signal is emitted within the useful frequency band 3 at approximately 433 MHz. A manipulated signal is emitted at approximately 2.45 GHz and is received by the second receiver 7 with a reception level above a threshold value S. The reception level of the manipulated signal can also differ significantly from the previously prevailing reception level, for example of the noise or of a permanent interference transmitter. This change in the level can be sensed equally as well as the absolute level above the threshold value S.

As the received signal strength lies above the threshold value S, or the change in level lies above another threshold value, the signal is then analyzed more precisely. For this purpose, it is possible, on the one hand, to demodulate the signal (demodulator 10 represented by dashed lines in FIG. 1) and feed it to the control unit 5. There, the code information which is possibly contained in the signal is compared with the setpoint code information. If both types of information at least largely correspond, it is assumed that the transmission link has been manipulated.

However, there may also be provision for the information content of the signal which is received outside the useful frequency band 3 not to be evaluated, after which it is immediately determined that manipulation has occurred if the change in the received level is large enough. As a result, it is possible to determine manipulation more quickly. However, then, signals which only happen to be received with a high level precisely at this time and which would not be capable of operating the antitheft device owing to the information contained in them are also considered as manipulation.

However, it is already possible to determine manipulation on the transmission link if the signal received outside the narrowband useful frequency band 3 does indeed have a signal reception level which is higher than a threshold S but the signal has this reception strength only within a predefined time window.

It is assumed here that the signal is a manipulated signal owing to the signal duration which corresponds approximately to the signal duration of the code signal in the useful frequency band 3. This is because the carrier frequency of the received signal lies outside the useful frequency band 3 and has a considerable signal level. Owing to its signal duration, the signal could contain the correct code information. In order to save time and nevertheless reliably detect manipulations of the transmission link, as soon the time period of the signal is shorter than the useful duration it is decided that there is a high probability of the signal being a manipulated signal. In order to be quite certain, the code information contained in the signal could be additionally evaluated. This is because the manipulated signal must contain the same code information as the actual code signal.

Figure 3:
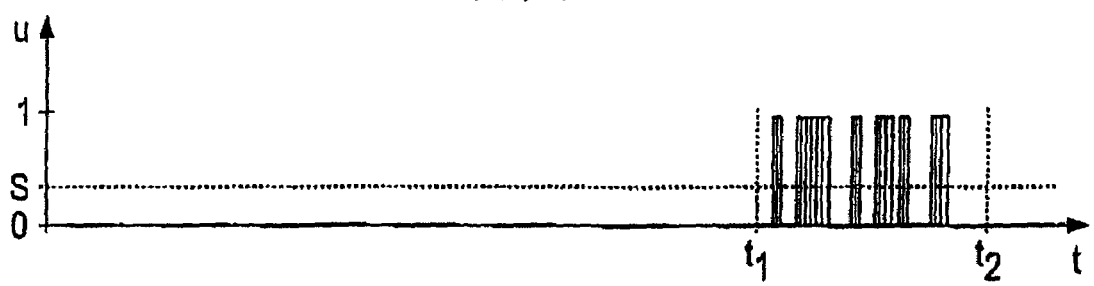
FIG. 3 shows a timing spectrum of signals which can be received by the antitheft device according to FIG. 1.

FIG. 3 illustrates a time spectrum of a manipulated signal. The signal is received by the second receiver 7 (i.e. outside the useful frequency band 3) between the times $t_1$ and $t_2$. The time $t_1$ represents the earliest time at which the code signal is anticipated, and the time period between $t_1$ and $t_2$ represents the signal duration of the correct code signal. If the signal received by the second receiver 7 were to last longer than the code signal duration, it would be possible to assume that it is an interference signal, but not a targeted manipulation with which it is attempted to simulate the code signal with its correct code information.

As soon as it is detected, or can be assumed with a high degree of probability, that the transmission link is being manipulated, the enable signal is suppressed, or even not generated at all, so that it is not possible to access the motor vehicle or use the motor vehicle.

The code generator 12 assigned to the base station 1 is dimensioned in advance in such a way that it only emits signals in the useful frequency band 3. Its transmission signal strength is just sufficient for signals still to be capable of being received with sufficient amplitude from a short distance in baseband or useful frequency band 3. Possible harmonics at higher frequencies are, on the other hand, then so small in their reception strength that they no longer lie above the threshold S and are therefore automatically not taken into account by the second receiver 7.

However, as soon as signals with signal levels or change levels greater than the threshold value S are received by the second receiver 7, and thus lie outside the useful frequency band 3 and additionally have correct code information or at least a signal time duration and signal time as in the correct code signal, it is assumed that manipulation is occurring. Manipulation which has been detected can then additionally be indicated visually or audibly in the motor vehicle (for example by the horn or by flashing light). A signal can also be transmitted back to the code generator 12 by the transmitter 11 of the base station 1 and received at said code generator 12 by a receiver 15 and trigger a visual or audible indication. A tactile indication can also be provided, in which vibration in the code generator 12 is used as a sign of the manipulation. Thus, the legitimate user can recognize whether the transmission link has been manipulated even if he has not activated his code generator 12 or a trigger switch in the motor vehicle, i.e. does not intend to use his motor vehicle right away.

In every country, specific frequency bands are permitted for various telecommunications uses. Thus, the code signals at carrier frequencies in narrowband useful frequency bands can be emitted at approximately 315 MHz (US, Japan), and 433 MHz or 868 MHz (Europe). It is also possible to use other useful frequency bands for example in the GHz range. The important thing for the invention here is that manipulations of the transmission link are recognized by detecting signals outside these useful frequency bands.

The request signal from the transmitter 11 of the base station 1 to the code generator 12 can be emitted, for example, at a frequency of 125 kHz. The carrier frequency of the request signal is however not relevant to the invention.

The threshold value S can, for example, be set in a variable fashion by means of a threshold value decision element. The threshold value is selected in such a way that it is reliably higher than the maximum anticipated amplitudes of the harmonics of the code signal. The threshold value S can also be defined by means of the components of the second receiver 7, which is then designed to be so insensitive that only signals starting from a specific level or threshold value S are received. Such receivers are then not very reception-sensitive and in addition very cost-effective. The threshold value S does not need to be fixed but rather can also depend on an individual basis on, for example, the frequency range in which the respectively received signal is found. For example, the threshold value S can become smaller the greater the distance between the frequency range and the useful frequency band 3.

The second receiver 7 should be able to receive signals at carrier frequencies in the largest possible frequency range (broadband receiver). Thus, the receiver can, for example, be configured for the frequency range between 800 MHz and 5.8 GHz if the useful frequency band 3 is at approximately 434 MHz if it is assumed that manipulated signals are emitted at least in this frequency range.

For the invention, the useful frequency band 3 is masked out and is not to be capable of being received by the second receiver 7. For this purpose, a bandstop filter or a filter can be arranged upstream or downstream of the second receiver 7, said bandstop filter or filter not allowing signals to pass at least in the useful frequency band 3.

Instead of the threshold value S, it is also possible to use an amplitude change as a measure for the decision as to whether the transmission link is being manipulated. For this purpose, the amplitudes of, for example, the noise or of any interference transmitters which happen to be present can then be measured and subsequently compared with the amplitudes then present when the anticipated reception of the code signal occurs. If there is a significant change (change is above a threshold value) in comparison with the previously measured amplitudes, the enable signal is suppressed or not generated in the first place. By sensing the changed amplitudes, permanent interference sources can be masked out and therefore do not give rise to an incorrect measurement of the received amplitudes.

The second receiver 7 can also be arranged on the code generator 12 (or both in the motor vehicle and on the code generator 12). The code signal is then not emitted to the base station 1 if a signal with an amplitude higher than a threshold value S or an amplitude change in comparison with the previous state is detected in the frequency range outside the useful frequency band 3.

If the second receiver 7 on the code generator 12 detects a manipulated signal outside the useful frequency band 3, a code signal which informs the base station 1 that manipulation has been discovered can also be transmitted to the base station 1 in the motor vehicle. Then, on the basis of this information, the enable signal is suppressed or not generated in the first place so that it does not become possible to access the motor vehicle or use the motor vehicle.

The invention therefore ensures that for each signal received outside the useful frequency band 3 it is decided whether said signal is merely a—permanently acting—interference signal or whether it could be a manipulated code signal with which an attempt is made to trick the antitheft device. As soon as it is detected that the signal could be a manipulated signal, the motor vehicle is not enabled.

The invention claimed is:

1. An antitheft device for a motor vehicle comprising:
a first receiver which is arranged at the vehicle end and which is designed to receive in narrowband and to demodulate signals which are emitted by a remotely arranged transmitter, the signals of the transmitter containing code information which is modulated with a predefined carrier frequency, the carrier frequency lying within a predefined useful frequency band,
an evaluation unit to which the signals which are received and demodulated by the first receiver are passed on and which extracts the code information from the demodulated signals, compares it with setpoint code information and generates an enable signal when the two signals at least largely correspond, wherein the antitheft device has a second receiver which is designed to receive signals in broadband, the carrier frequencies of which signals lie outside the useful frequency band.

2. The antitheft device as claimed in claim 1, wherein the second receiver is arranged at the vehicle end and/or at the code generator end.

3. The antitheft device as claimed in claim 1, wherein a discriminator is connected upstream or downstream of the second receiver and permits evaluation only if those signals which are received by the second receiver and whose signal reception strength exceeds a threshold value or which have changed significantly in terms of their amplitude in comparison with previously measured reception levels, the evaluation unit not generating or suppressing the enable signal if a signal is received at a signal reception level or with a change amplitude greater than a threshold value and/or if the code information contained in the signal at least largely corresponds to setpoint code information.

4. The antitheft device as claimed in claim 1, wherein a time window decision element is arranged at the vehicle end, said time window decision element preventing the generation of the enable signal or suppressing it if the received signal is received with its signal level starting from a predefined time at which the reception of a signal is anticipated, and the signal level is above a predefined threshold value for at maximum a predefined time period (t2–t1).

5. The antitheft device as claimed in claim 1, wherein a triggering transmitter (11) is arranged at the vehicle end and when triggering occurs it emits a request signal by means of which a portable code generator (12) is requested to transmit back a signal after reception of the request signal.

6. The antitheft device as claimed in claim 1, wherein a request signal emits in the frequency band of 125 kHz in the case of a low-frequency carrier frequency, and the request signal is transmitted back in a narrowband useful frequency band of 315 MHz, or of 433 MHz or of 868 MHz, in the case of a high-frequency carrier frequency.

7. The device as claimed in one of the preceding claims, characterized in that the second receiver has a bandstop filter by means of which at least the previously defined, narrowband useful frequency band is masked out when signals are received.

8. A method for operating an antitheft device for a motor vehicle, wherein
a first receiver arranged at the vehicle end is used to receive and demodulate signals within a useful frequency band and evaluate the code information contained in them,
a second receiver can be used to receive signals outside the useful frequency band, and
an enable signal is suppressed or not generated if the second receiver is used to receive a signal which contains code information which corresponds to setpoint code information or whose signal level is above a predefined threshold value only within a predefined time period.

9. The method as claimed in claim 8, wherein the reception levels of the signals are detected and only signals whose reception levels exceed a threshold value defined as a function of the respective frequency band or differ significantly from previously measured reception levels are evaluated.

10. A method for operating an antitheft device for a motor vehicle comprising the steps of:
receiving a transmitted signal by a narrowband receiver and a wideband receiver which excludes the narrowband;
generating an enable signal if the narrowband receiver receives a valid code and the wideband receiver does not receive a signal having predefined characteristics.

11. Method as in claim 10, wherein the predefined characteristics are determined by a time discriminator.

12. Method as in claim 10, wherein the predefined characteristics are determined by a threshold value discriminator.

13. Method as in claim 10, wherein the predefined characteristics are determined by a level change discriminator.

14. Method as in claim 10, wherein the transmitted signal is triggered by sending a request signal.

15. Method as in claim 10, wherein a coded information is extracted from the received signals and compared with stored setpoint information.

16. Method as in claim 10, wherein the signal received by the wideband receiver is demodulated and compared with stored setpoint information.

17. Method as in claim 10, wherein the time period of the received signals is compared to determine whether the received signal has been manipulated.

18. Method as in claim 17, wherein in addition a signal received by the wideband receiver is demodulated and compared with the information demodulated from the narrowband signal to determine whether the signal has been manipulated.

19. Method as in claim 10, wherein if no enable signal is generated a manipulation detection signal is signalized.

20. Method as in claim 19, wherein the manipulation signal is a signal from the group consisting of visible, audible, or tactile signals.

* * * * *